Patented May 14, 1940

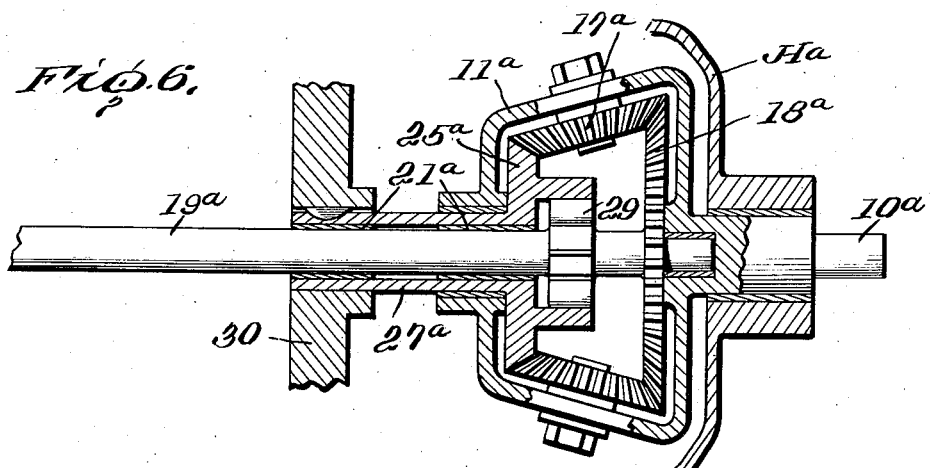
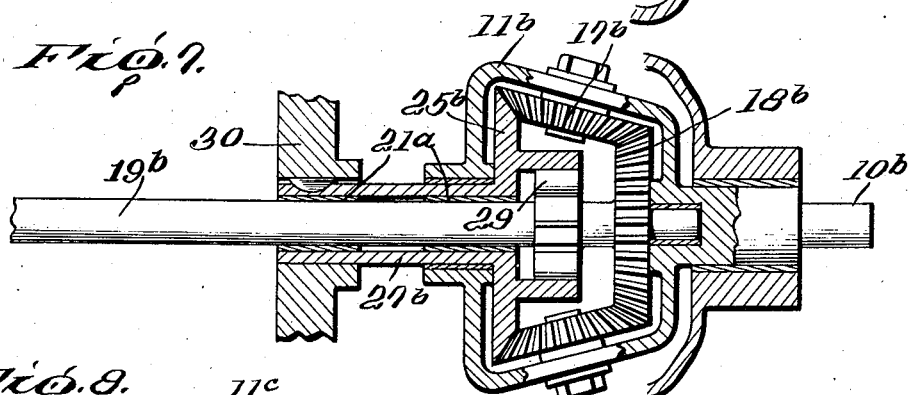
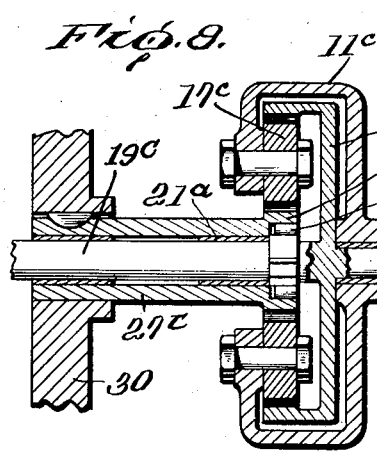
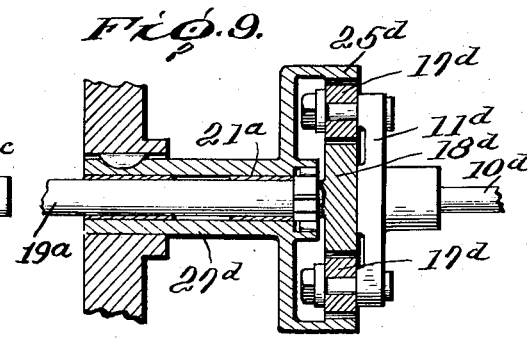

2,200,566

UNITED STATES PATENT OFFICE 2,200,566

VARIABLE RATIO TRANSMISSION

Otto E. Szekely, Elmira, N. Y., assignor to The Szekely Company, Inc., a corporation of New York Application June 4, 1937, Serial No. 146,482

11 Claims. (Cl. 74—293)

This invention relates to improvements in variable ratio transmissions, and is concerned with mechanisms by which torque increment effects may be attained under automatic control by the load demand.

One of the features of the present invention is the provision by which plural ranges of torque ratio transmission may be effected mechanically, with inversely corresponding speed ratios, and with the employment of a manual control for determining braking effects by which the system may also be shifted from one ratio to another.

Another feature of the present invention is the provision of a structure including a plurality of power transfer devices which may be successively and selectively brought into action in accordance with existing relationships of torque delivered by the prime mover and torque demanded by the load, and providing a multiplicity of ratios through mechanical drive, and permitting the operator's control of the actuation effected through these mechanical drives.

Another feature of the present invention is the provision of a variable ratio transmission including two differentiating gear sets which are selectively energized and operate under plural conditions of energization for producing variable torque transfers through the structure, one of these gear sets including dual gear means whose movements may be selected mechanically for determining a mechanical ratio of connection of parts.

Other features of the invention reside in the construction and arrangement of parts, as will appear more fully hereinafter and upon the drawings.

Illustrative forms of practicing the invention are set out on the accompanying drawings, in which:

Figure 1 is an upright longitudinal section through a transmission according to the present invention.

Figures 2, 3, 4 and 5 are successive transverse sectional views, respectively taken subtsantially on lines 2—2, 3—3, 4—4, and 5—5 of Fig. 1.

Figures 6, 7, 8 and 9 are fragmentary views, showing modifications of construction.

Figure 1:
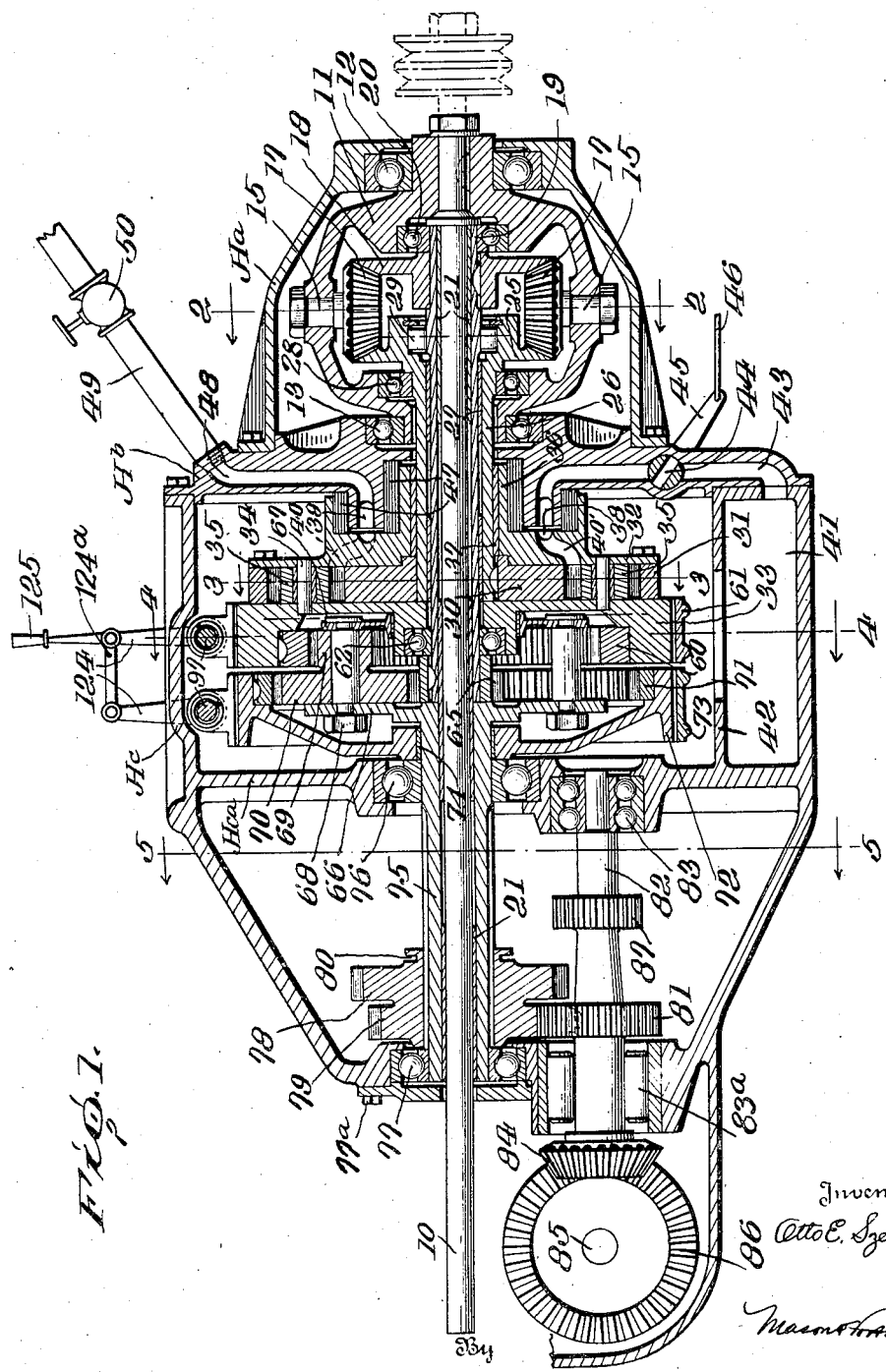
Figure 2:
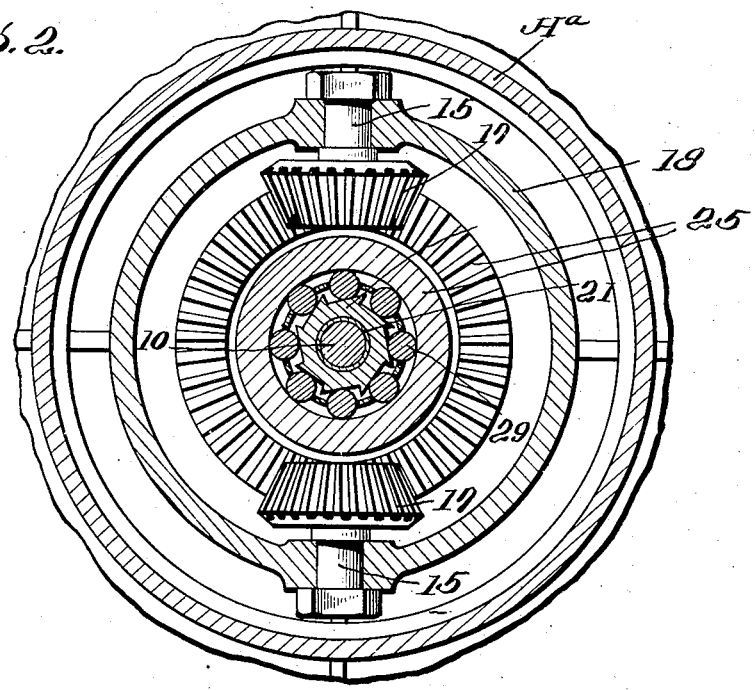

In these drawings, the transmission is constructed and arranged to transmit power from a prime mover to a load. For this purpose, the input shaft 10 is provided as a driving shaft, being connected in suitable manner to a prime mover (not shown). This shaft 10, in the embodiment of Figs. 1 to 5, extends through the length of the transmission housing, so that it can be driven by an internal combustion engine or other prime mover connected to its left-hand end (Fig. 1). This housing is comprised of a first section Ha, a partition and stiffening wall Hb, and a section Hc having an intermediate web wall Hca. These parts are connected together in liquid-sealing relation, and are constructed and arranged to be properly centered when brought together for assembly, by the provision of flanges thereon.

The shaft 10 is connected by a key to the differential case 11 which turns in the supporting anti-friction bearings 12, 13 carried by the housing sections Ha and Hb. This differential case supports the pivot pins 15 which operate through appropriate bearings to support the planet pinions 17 of the differentiating gearing. A first sun gear 18 is keyed to a hollow shaft 19, and is supported by the anti-friction bearings 20 for free rotation within the differential case 11. Appropriate intermediate bearings 21 are provided for supporting the hollow shaft 19 and the driving shaft 10 with respect to one another, along their lengths.

A second sun gear 25 is formed integrally with a hollow shaft 26 which surrounds the hollow shaft 19, and is supported in respect thereto by the further bearings 27. An anti-friction bearing 28 is provided to assure freedom of rotation of the second sun gear 25 with respect to the differential case 11. The second sun gear 25 also provides the outer ring of an overrunning clutch (Fig. 2), by which the clutch rollers 29 are made effective for controlling the relative revolution of the shafts 19, 26 in one direction.

Figure 3:
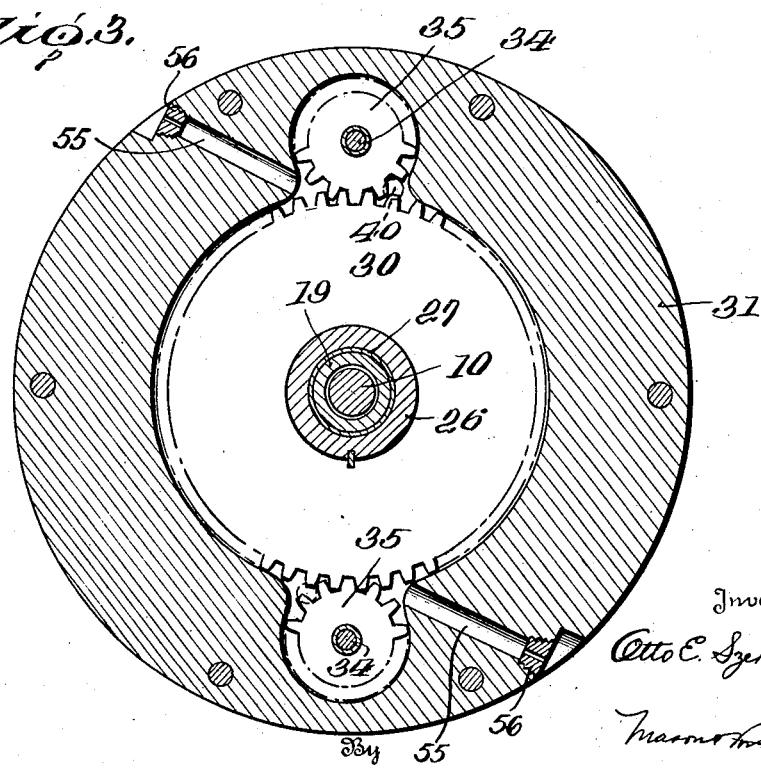

The hollow shaft 26 is keyed to the inner gear 30 of a fluid displacement means which is shown in its presently preferred form of a gear pump having a central housing portion 31 and an end closing wall 32, the other end or face being closed by the wall structure 33 of a gear member, which will be described in detail hereinafter. These walls support the pins 34 about which may rotate the gear pump pinions 35 (Fig. 3). The wall 32 is formed integral with a sleeve 36 which is mounted by a bearing 37 for relative rotation with respect to the hollow shaft 26. This sleeve has an annular channel 38 which is in alignment with a similar channel 39 in the housing portion Hb, for the proper transfer of liquid between these parts. From the channel 38, the ports 40 for the inlet of liquid to the gears of the gear pump pass.

The portion Hc of the frame provides a sump 41 which is partly shut off by an apertured horizontal partition 42 from the upper space in which are provided the pump parts and certain gears, as described hereinafter. From this sump leads a passage 43 which is formed in the housing portion Hb, to provide for the suction of liquid from the sump into the channel 39. This passage can be partly or wholly closed by a valve 44 which is operated by an external crank 45 by means of a link 46 which may be controlled manually or by a pedal, or in otherwise as desired. The entrance of air to the channels 38, 39, and the escape of liquid therefrom, is prevented by the packings 47. A further passage 48 leads from the channel 39, within the housing portion Hb, to a conduit 49 which has a control valve 50. When this control valve 50 is open, air can pass through the conduit 49 and break the suction being established by the gear pump; and when this valve 50 is closed, the pump takes liquid from the sump 41.

As shown in Fig. 3, the housing portion 31 has the discharge passages 55, with the calibrated control plugs 56 therein. Liquid discharged through these passages and plugs is retained within the housing structure Hc and passes back to the sump 41 for recirculation.

The structure 33 is provided with an internally cut gear ring 60, and has a cylindrical external surface for engagement with a brake band 61, this band being effective, upon engagement, to hold the structure 33 against movement relative to the frame as provided by the aforesaid housing parts. The structure 33 is supported by anti-friction bearings 62 for free rotation about the extended portion of the hollow shaft 19.

The hollow shaft 19 is keyed to a gear 65.

An epicyclic spider comprises the flange 66 and the rings 67, these parts being connected together by studs or bolts 68, certain of these bolts providing pivots about which may turn the compound planet pinions which are comprised of the small gear portion 69 in mesh with the teeth of gear ring 60, and the large gear portion 70 in mesh with gear teeth 71 which are provided in a ring carried by a drum 72. This drum is provided with a circular external surface for engagement by a second brake band 73, which likewise is effective for holding the drum 72 against motion relative to the fixed frame. The drum 72 is carried by a bearing 74 for free rotation relative to a sleeve 75 which is secured to or formed integral with the epicyclic spider flange 66. This sleeve 75 is supported by anti-friction bearings 76 carried in the web wall Hca, and by the anti-friction bearing 77 in the end wall of the housing structure Hc. This anti-friction bearing 77 is indicated as held in position by a pressure member 77a.

The portion of the hollow shaft 75 between the bearings 76 and 77 is splined to receive the change speed and reverse gear member 78, 79 which has a groove 80 for engagement with the usual fork (not shown) by which this gear may be slid along the splined portion of the hollow shaft 75. According to the position assumed by the gear member 78, 79, power may be delivered out of the hollow shaft 75 to the gear 81, and thus to the final drive shaft 82 which is supported by the anti-friction bearings 83 and 83a, and has the bevel gear 84 for accomplishing the driving of a load which is illustratively shown as a shaft 85 having a bevel gear 86 thereon. This position of the parts is shown in full lines in Fig. 1. The gear members 78, 79 may be moved to other positions, in some of which they may be fully disengaged from other gear members (corresponding to "neutral" positions), or the gear portion 78 may be engaged with the gear 87 on shaft 82 for driving at a higher rate of speed, or it may be engaged (Fig. 5) with an idler 88 through which power may be transmitted to a gear 89 and thus to the gear 81 for causing a driving of the load 85 in the reverse direction.

Figure 4:
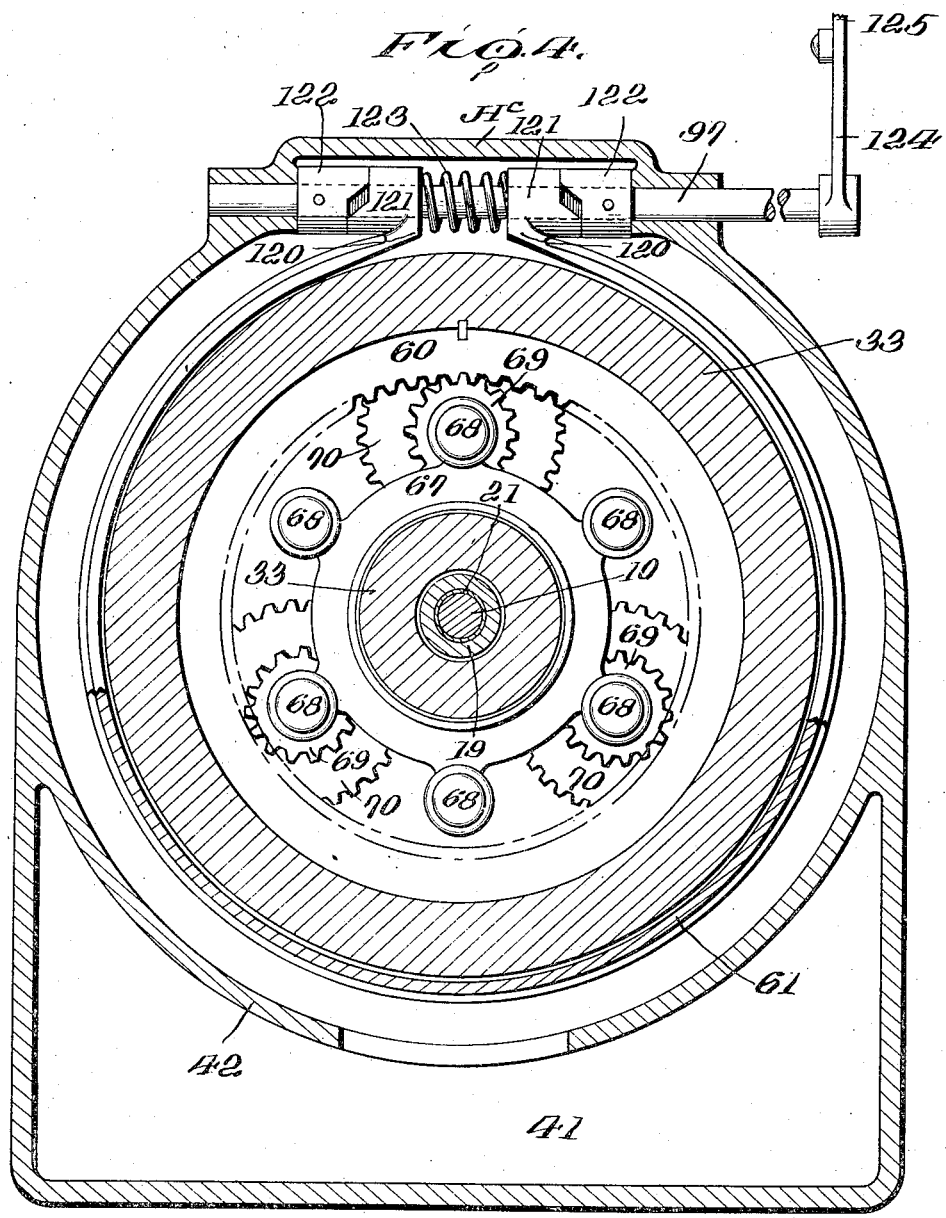
Figure 5:
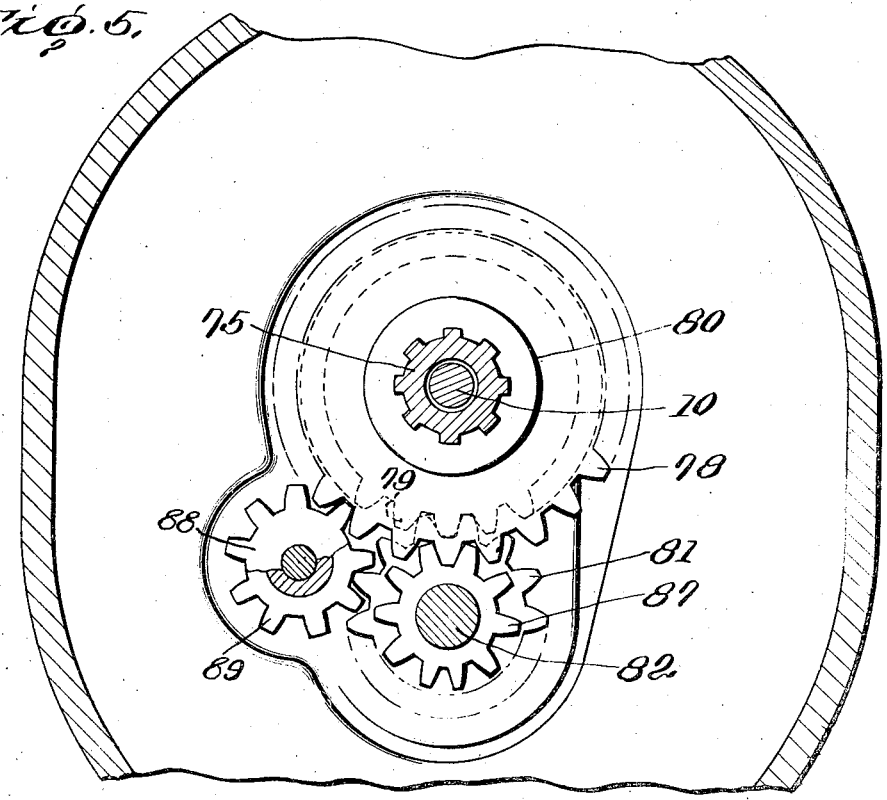

As shown in Fig. 4, the ends 120 of the brake bands 61, 73 may be provided with ears 121 having beveled end surfaces thereon. A rock shaft 97 passes through the ears and is provided with collars 122 having beveled end surfaces for camming action with the beveled end surfaces on the ears for forcing the ears together and thus applying the corresponding brake band upon the underlying drum surface. Upon movement of the rock shaft in the opposite direction, the brake bands expand by reason of their own resiliency and by the action of the springs 123, so that the bands are removed from engagement with the corresponding brake drum surface. The rock shaft 97 may be moved by a crank 124.

The manner of operation of the structure is as follows:

Assuming that the prime mover and load are at a standstill, then all parts of the transmission are likewise at a standstill.

If the prime mover is in motion and delivering merely sufficient torque to provide for mechanical losses, the prime mover shaft 10 turns the differential case 11 at its own speed. It may be assumed that the valve 44 is closed and the air bleeder 50 is open, so that there is no retardation or back pressure effect at the gear pump 30, 31, 35. Both brake bands 61, 73 are disengaged. The rollers 29 prevent the sun gear 25 and inner pump gear 30 from turning faster than the shaft 19, by reason of any retardation effects and by pressures upon the gear 65; and hence gears 18, 25 and pump gear 30 are turning at the speed of the shaft 10. The gear 65 is rotating at the speed of shaft 10 and is turning the gear 70, but the corresponding gear ring 71 is free to turn backwards or opposite to the movement of the shaft 10, as the brake band 73 is disengaged; and hence simple rotation of the drum 72 occurs, and the gear 70 also turns backwards without causing the spider 66 to move. Rotation of the corresponding gear 69 also causes the gear ring 60 to turn backwards, as there is no blocking effect by the brake band 61. Thus, the parts spin without substantial losses, and the final load 85 remains at a standstill.

If it now be assumed that the device is employed in a vehicle which is traveling over a road or railway track having successively lesser slopes, so that the vehicle is passing from a steep hill to a lesser grade, and then to a level, the operation of the system under these conditions of successively reduced torque demand by the load may be traced. It will be assumed that the prime mover is in motion at a definite speed and that it is delivering a definite torque at this speed, and that the load demand at the shaft 85 is exactly satisfied by the prime mover torque output (with the given position of gear members 78, 79).

While ascending the steep hill, it will be assumed that the brake band 61 is engaged, the brake band 73 being free and the valve 44 still closed. The engagement of the brake band 61 brings to a stop 60, 33 and other parts rigidly attached to 33, so that a load on the gear 65 is created through gears 69, 70 and the teeth of 60. This pressure upon gear 65 now appears as a pressure in the gear 18, which normally would cause the planet gear 17 to spin, but this spinning is still prevented by the action of the clutch rollers 29. Hence a strictly mechanical drive is established at a torque ratio such as 10:1, as the parts of the differential 11, 18, 17, 25 turn at the same speed as the prime mover shaft 10, and the gear 65 also turns at this same speed and torque. A speed reduction and a torque multiplication therefore occur in proportion to the diameters of the gears 65, 70, 69 and 60, so that the epicyclic spider 66 drives the splined shaft 75 and therewith the load.

When the vehicle passes from the steep hill to the lesser grade, the torque demanded by the load decreases and the prime mover would normally tend to speed up, so that the vehicle speed is a function of the torque-speed characteristic of the prime mover. The driver of the vehicle can now close the air valve 50 and open the valve 44. The parts of the gear pump have been moving relative to one another, as the gear 30 has been turning forward at the same angular speed as the shaft 10, and the pump housing is held at a standstill by the brake band 61. The admission of liquid to the gear pump causes this liquid to be discharged through the passages 55, so that back pressures are set up at the plugs 56, which appear as pressures in the gear pump itself, tending to slow down the inner pump gear 30 because the housing 31, 32 is at a standstill, while a corresponding reaction is set up which tends to accelerate the housing 31, but is prevented from being effective as the housing is held fast by the brake band 61. The pressures thus developed on the inner pump gear 30 cause the sun gear 25 to be slowed down. Ultimately, at a maximum delivery of liquid, the structures in the first differential cause the shaft 21 to be driven at, say, twice the speed of the shaft 10 but at one half of the torque thereon, the other half of the torque at the shaft 10 being utilized to effect the action in the gear pump. The gear 65 is thus driven at a greater rate of speed, so that the load is driven at a speed which may be, say, 1:5, with appropriate dimensions of the gears, relative to the prime mover speed. This is accompanied also by a reduction of the prior torque ratio to a ratio of 5:1 under the given speed conditions. This condition, it will be noted, is attained automatically and as a result of the torque demand of the load itself, upon closing the valve 50 and opening the valve 44. Hence the operator can effect a speed and torque control by varying the volume of liquid which is being passed through valve 44, by a control of this valve, or by controlling the mixture of liquid and air by means of a slight opening of the valve 50.

If the vehicle passes from this lesser grade to a level road, it tends to speed up by reason of the reduction of torque demand. The operator may now release the band brake 61 again, and thus eliminate the reaction in the pump and second epicyclic relative to the frame. The pressure effects in the pump cause the pump housing to turn in a forward direction, and ultimately the hydraulic reaction effects tend to cause the parts of the first differentiating gear, the pump, the gear 65, and the shaft 75 to turn at the same speed, with a 1:1 torque and speed ratio between the prime mover shaft 10 and the splined shaft 75, corresponding to direct drive. Under this condition, all parts of the first differential (comprising the case 11, sun gears 18, 25, and planet pinions 17) turn at prime mover speed; and the pump gears 30, 35, and the pump housing 31, 32, 33 likewise turns at prime mover speed. Under the assumption given above, this represents a condition at which the demand of the load 85 is precisely satisfied by the engine torque output, at the gear ratios which have been constructed and established. Any changes in the torque demand will now be accompanied by a yielding in the hydraulic system, and the automatic determination of a ratio which will permit satisfaction of the load demand.

If the brake band 73 is engaged immediately following the disengagement of the brake band 61, then the parts operate (when the pump is out of service due to lack of oil supplied thereto) to produce a mechanical drive at a ratio which differs from the ratio established with the brake band 61 applied. For example, the ratio of the gears 65—70 and 69—60 may be such as to produce a mechanical speed ratio of 1:4 and a torque ratio of 4:1 under these conditions.

If the brake band 73 is continued in applied position, and liquid admitted to the gear pump, a similar speed increment is possible, under control of the load torque demand, until a speed ratio of 1:2 and a torque ratio of 2:1 is derived.

If the brake band 73 is then released, the hydraulic system again operates to bring the parts up to a 1:1 ratio or direct drive, as before.

It will be noted that even if the liquid system is entirely drained or disrupted, the operator of the vehicle still has two mechanical speeds under his control, representing a 10:1 torque ratio when the brake band 61 is engaged, and a 4:1 torque ratio when the brake band 73 is engaged. Thus the vehicle may be moved even though the hydraulic system is out of service for any reason; and these conditions may also be employed by the operator if he desires to maintain a substantially constant vehicle speed without an automatic torque ratio selection with the corresponding speed ratio effects; or if he desires to control the vehicle speed by direct control at a throttle of the variable speed internal combustion engine, as is the present-day practice with automobiles. Thus, the structure affords flexibility and permits the operator to control the conditions of service.

Furthermore, it is obvious that like conditions can be established for the phases of bringing a vehicle or other load from standstill into motion, and to maintain it at a desired torque and speed level as demanded by the load and as determined by the prime mover output at the selected prime mover speed.

While the above operations have been described for a single position of the gears 78, 79, it is apparent that a like condition prevails for any other engaged position thereof. Likewise, the speed and torque at the prime mover shaft 10 may be varied, without any change in the above operation, so long as the torque and speed demands at the load maintain corresponding relative levels.

The structure, further, operates for automatically establishing a torque ratio, and the corresponding speed ratio, when the torque demand of the load is not satisfied by the torque output of the prime mover at the prevailing speed; this action being feasible in each of the above conditions where the fluid displacement means is made operative by the closing of the valve 50 and the opening of the valve 44. Under such conditions of increase of load demand, or decrease of the engine output of torque, the tooth pressures relatively exceed the back pressures at the fluid displacement means, so that fluid is moved therefrom and relative slippage occurs in the gear pump. Since this slippage represents relative movements in the first differential, and likewise represents relative movements of the epicyclic gearing, it is obvious that a greater ratio of gear reduction is established during these periods of slippage, until a condition is found by the parts at which the prevailing gear ratio enables the prime mover, at its given speed and torque output, to satisfy the torque demand of the load, and then this particular gear ratio determines the speed of movement of the load.

Thus, the system as described permits a purely mechanical drive, at speeds determined by the prime mover when the gear pump is free of liquid. If this is accomplished, with the brake band 73 engaged, the torque ratio at the hollow shaft 75, compared with that of the prime mover shaft 10, is 10:1. When this is accomplished with the brake band 61 engaged, the corresponding ratio is 4:1.

When the valve 44 is opened, and the valve 50 is closed, so that the gear pump operates to produce and be controlled in its rotation by the back pressure effects, automatic torque ratio adjustment can be accomplished. When the brake band 73 is engaged, this produces a torque ratio between 10:1 and 5:1, with the size of the parts as above referred to. When the brake band 61 is engaged, the corresponding automatically-found ratio is between 5:1 and 2:1. When both brake bands 73 and 61 are disengaged, and the gear pump is receiving a full supply of oil from the sump, the torque ratio is normally somewhere between 5:1 and 1:1, unless the engine torque is equal to the load torque (in which event the ratio is definitely 1:1 or direct drive), or unless the engine torque is momentarily greater than the load torque demand (in which event the load is accelerated up to direct drive, and then the prime mover speeds up, until a condition is found at which the 1:1 ratio is maintained).

Figure 10:
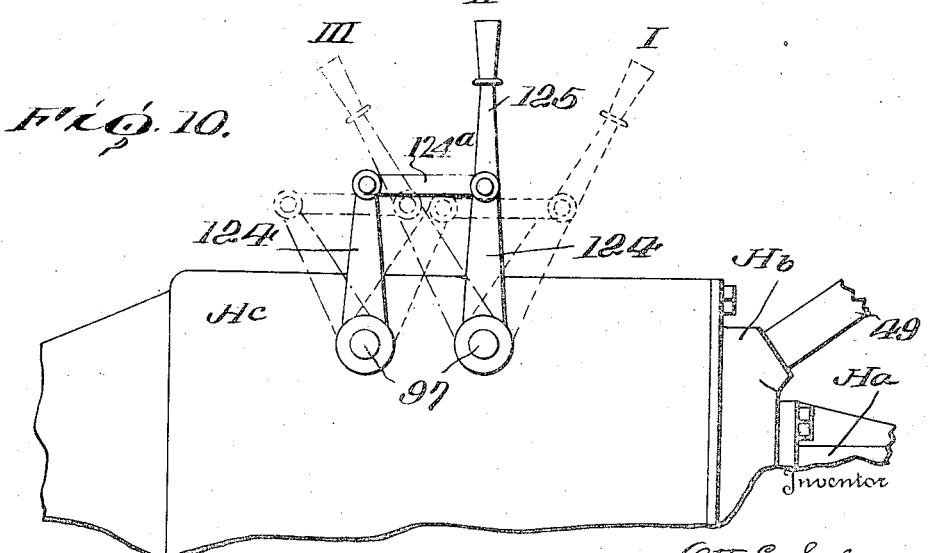
Figure 10 is a detail view of a device for controlling the brake bands.

While the brake bands 61 and 73 may be operated individually for effecting control of selected speed and torque ratios, and moved together for effecting a positive braking of vehicle movement, it is preferred to operate them in unison, for which purpose an illustrative structure is set forth in Figs. 1, 4 and 10. The rock shafts 97 for controlling the individual bands are mounted in the housing portion Hc and are provided inside the housing with the opposed cam or wedging collars 122 cooperative with the collars 121 within which the corresponding rock shaft may turn. The collars 121 are connected to the ears 120 which project from the corresponding bands 61 or 73, and are normally forced apart by the resiliency of the bands themselves and by the spring 123. The collars are made right-and-left as shown, and are so arranged that a clockwise movement of one shaft 97 closes the corresponding band while the simultaneous clockwise movement of the other shaft 97 opens or maintains the open position of its corresponding band. Outside the housing, each shaft 97 has an arm 124, these arms being connected by a link 124a. One of the shafts has an operating handle 125.

When the handle 125 is in the position I shown in Fig. 10, the arm 124 for the right-hand shaft 97 has moved this shaft until its collars 122 ride up on the collars 121 and force the latter toward one another until the band 61 is tightly applied to the drum 33, 60, so that the aforesaid illustrative ratio of 10:1 is attained in mechanical drive. When the handle is in the central position II, the two bands are disengaged, and the driving shaft 10 is disconnected from the load if the hydraulic system is ineffective. When the handle 125 is in the left-hand position III, the arm 124 for the shaft 97 of the band 73 is actuated for causing the corresponding collars to apply this band, and the aforesaid ratio of 4:1 of mechanical drive is attained (position of Fig. 4). It will be noted from Fig. 4 that the collars 121 and 122 are shaped to have relative movement in the peripheral direction, without movement in the axial direction when the corresponding band is not to be engaged: thus in Fig. 4, these collars have been rocked until the cooperating wedging surfaces are separated from one another. When, however, the collars are actuated to cause engagement of the corresponding band, the end surfaces of the collars come into engagement so that the parts remain engaged as no forces are then present tending to rock the shaft 97.

While the device has been explained as applied to an automotive vehicle, it is obvious that it can be employed in many ways, in association with prime movers having fixed speeds and variable torques, or having variable torque and speed relations; and in association with loads of various natures, in which the torque demand changes by reason of acceleration, or by reason of variability of the load at constant speed.

In the above description, the differential member 11 has been referred to as a differential case, and the carrier structures 66, 67 have been referred to as a flange and ring comprising an epicyclic spider. The case and spider are employed in gearing arrangements which comprise sun gears and planet pinions, so that these terms are interchangeable, but have been employed for simplicity of description and claiming. The ratios in the epicyclic set 65, 70, 71, 69 and 68 may be varied for controlling the ratio effects above described. Furthermore, it is also possible to control these ratios by modifying the relationship of gears in the differential set.

In Fig. 6, the housing Ha supports the driving shaft 10a as before. This driving shaft 10a is connected to the differential case 11a having pivot pins for the planet pinions 17a, these planet pinions being in mesh with the sun gears 18a and 25a; of which the sun gear 18a is connected to a tail shaft 19a corresponding to the shaft 19 of Figure 1 and mounted in bearing sleeves 21a in a hollow shaft 27a, and the sun gear 25a is connected by the hollow shaft 27a with the inner pump gear 30 of the displacement pump used in the illustrative showing of Fig. 1. The clutch rollers 29 are again interposed between appropriate surfaces on the sun gear 25a and on the tail shaft 19a. The sun gear 18a is larger than the sun gear 25a: and hence the sun gear 18a is not driven at twice the speed of the differential case 11a when the sun gear 25a is held at a standstill or substantial standstill with respect to the pump assembly, and hence a greater multiplication of torque occurs in the system, for given sizes at the gears in the epicyclic set and in the final variable transmission set.

An inverse condition is shown in Fig. 7, where the drive shaft 10b is connected to a conventionalized differential case 11b which supports the planet pinions 17b for meshing engagement with the sun gears 18b and 25b. The sun gear 18b is smaller than the sun gear 25b and is connected to a final shaft 19b. The sun gear 25b is connected to the hollow shaft 27b, and thus to the inner pump gear 30. In this case, the torque multiplication is less, with the same assumed relative sizes of parts in the other gear sets.

It is likewise possible to construct the first differentiating gearing of strictly epicyclic type, as shown by Figs. 8 and 9.

In the form of Fig. 8, the driving shaft 10c is connected to the differential case 11c, which supports the planet pinions 17c in mesh with the large sun gear 18c and the small sun gear 25c. The sun gear 18c is connected to the final drive shaft 19c as before, while the small sun gear 25c is connected by the hollow shaft 27c with the inner pump gear 30. This arrangement of parts corresponds to that of Fig. 6, in producing a greater torque multiplication.

In the form of Fig. 9, the differential case 11d is connected to the driving shaft 10d and carries the planet pinions 17d which are in mesh with the small sun gear 18d and the large sun gear 25d. The sun gear 18d is connected with the final drive shaft 19d, while the sun gear 25d is connected by the hollow shaft 27d with the inner pump gear 30. This arrangement corresponds with that of Fig. 7, in its effects.

The relative sizes of the sun gears in the first differential gearing, for the various forms, are selected according to the requirements of the system. Thus, the forms of Figs. 6 and 8 are advantageous for heavy duty vehicles such as trucks, where a slow acceleration between speed ratios is preferable and desirable. With lighter vehicles, such as fast passenger automobiles, the forms of Figs. 7 and 8 provide for rapid acceleration between these particular ratios.

Structurally, the illustrated assembly is advantageous as it provides three compartments in the housing structure, these compartments receiving, in order from the right-hand end in Fig. 1, the first differential gearing, the fluid displacement pump structures and the second differentiating gearing, and the final transmission set; and hence permit the employment of closely spaced bearings which are illustrated as of antifriction type, for permitting the easy movement of the parts in respect to one another and the housing, and support these parts at points where the parts perform relative movements during conditions of heavy load demand.

This is a hydraulically-controlled mechanically-driven transmission in which maximum loads to be moved respective to the various established gear ratios are actuated through and by a mechanical drive, and the hydraulic means is used for the transfer from one speed-torque ratio to another.

In the illustrated form, the invention has been shown as arranged for a prime mover of low torque characteristic at low speeds, such as an internal combustion engine. For such purposes, the engine may be connected to the left-hand end of the driving shaft 10. When it is desired to start the engine, both hand brakes 61 and 73 are released, so that substantially no drag is exerted upon the parts during this initial movement.

It is obvious that the invention is not limited solely to the forms of construction illustrated, but that it may be employed in many ways within the scope of the appended claims.

I claim:

1. In a variable ratio transmission, a frame, a driving member, a driven member, a first differentiating gearing including three elements movable relative to one another; a second differentiating gearing having elements comprising a spider having compound pinions thereon, first gears of different effective diameters engaged with said pinions, and a further gear of a yet-different effective diameter engaged with one of said pinions, and means for selectively restricting the movement of said first gears relative to the frame; said first gearing having one element connected to one of said members and said second gearing having one element connected to the other of said members, means mechanically connecting a second element in the first gearing with a second element in the second gearing, and a variable effort brake connected to the third element of said first gearing and to another element of said second gearing for controlling the relative movements in said gearings.

2. In a variable ratio transmission, a frame, a driving member, a driven member, a first differentiating gearing including three elements movable relative to one another; a second differentiating gearing having elements comprising a spider having compound pinions thereon, first gears of different effective diameters engaged with said pinions, and a further gear of a yet-different effective diameter engaged with one of said pinions, and means for selectively restricting the movement of said first gears relative to the frame; said first gearing having one element connected to one of said members and said second gearing having one element connected to the other of said members, means mechanically connecting a second element in the first gearing with a second element in the second gearing, a variable effort brake connected to the third element of said first gearing and to another element of said second gearing for controlling the relative movements in said gearings, and means cooperating with the said second and third elements of said first gearing for preventing said third element from turning faster than said second element thereof.

3. In a variable ratio transmission, a frame, a driving member, a driven member, a first differentiating gearing including three elements movable relative to one another; a second differentiating gearing having elements comprising a spider having compound pinions thereon, first gears of different effective diameters engaged with said pinions, and a further gear of a yet-different effective diameter engaged with one of said pinions, and means for selectively restricting the movement of said first gears relative to the frame; said first gearing having one element connected to the driving member and the spider of said second gearing being connected to the driven member, means mechanically connecting a second element in the first gearing with said further gear in the second gearing, and a variable effort brake connected to the third element of said first gearing and to another element of said second gearing for controlling the relative movements in said gearings.

4. In a variable ratio transmission, a frame, a driving member, a driven member, a first differentiating gearing including three elements movable relative to one another, one of said elements being a differential case, a second differentiating gearing having elements comprising a spider having compound pinions thereon, first gears of different effective diameters engaged with said pinions, and a further gear of a yet-different effective diameter engaged with one of said pinions, and means for selectively restricting the movement of one of said first gears relative to the frame; said differential case being connected to one of said members and said spider of the second gearing being connected to the other of said members, means mechanically connecting a second element in the first gearing with said further gear in the second gearing, a variable effort brake connected to the third element of said first gearing and to a first gear of said second gearing for controlling the relative movements in said gearings, and means cooperating with said second and third elements of said first gearing for preventing said third element from turning faster than said second element thereof.

5. In a variable ratio transmission, a frame, a driving member, a driven member; a differential case connected to said driving member, a planet pinion journalled on said differential case, first and second gears in mesh with said planet pinion, and an overrunning clutch for preventing said first gear from turning faster than said second gear; an epicyclic spider connected to said driven member, a compound planet pinion on said spider, large and small gears in mesh with said compound planet pinion, a further gear in mesh with one section of said compound planet pinion; first brake means for selectively restricting the movement of said large and small gears relative to the frame, means connecting said second gear with said further gear, and further brake means connected to said first gear and to one of said large and small gears for restricting the relative movements thereof.

6. In a variable ratio transmission, a frame, a driving member, a driven member, a differential case connected to said driving member, a planet pinion journalled on said differential case, first and second gears in mesh with said planet pinion, and an overrunning clutch for preventing said first gear from turning faster than said second gear; an epicyclic spider connected to said driven member, a compound planet pinion on said spider, large and small gears in mesh with said compound planet pinion, a further gear in mesh with one section of said compound planet pinion; brake means for restricting the movement of said large gear relative to the frame, brake means for restricting the movement of said small gear relative to the frame, means connecting said second gear with said further gear, and further brake means connected to said first gear and to one of said large and small gears for restricting the relative movements thereof.

7. A transmission as in claim 5, in which the further brake means comprises a gear pump having a housing connected to said one gear, an inner gear connected to said first gear, and means for establishing a back pressure effect in said gear pump.

8. A variable ratio transmission comprising a frame, a driving member; a first differentiating gearing having a differential case connected to the driving member, first and second sun gears, a planet pinion, and means for preventing the second sun gear from turning faster than said first sun gear; a second epicyclic gearing having two large orbit gears of different size, a small sun gear connected to said first sun gear, a spider, and compound pinion means in mesh with said small sun gear and said orbit gears; a driven member connected to said spider; first means effective for holding said second sun gear substantially at the speed of one of said large orbit gears, second means for holding the said one large orbit gear against movement relative to the frame, and third means for holding the other large orbit gear against movement relative to the frame.

9. A transmission as in claim 8, including means for selectively engaging one or the other of said second and third means whereby to determine different mechanical ratios of drive, said first means including adjustment devices for causing the transmission to operate at the selected mechanical ratio.

10. A transmission as in claim 8, including means for selectively engaging one or the other of said second and third means and for releasing both said second and third means, said selective engaging means being effective for determining different mechanical ratios of drive, said first means including adjustment devices for causing the transmission to operate at the selected mechanical ratio.

11. A variable ratio transmission comprising a frame, a driving member; a driven member, first and second differentiating gearings, one of said gearings being connected to the driving member and the other of said gearings being connected to the driven member, said other gearing including a plurality of gears of differing sizes and selectively engageable individual brake means for detaining one or another of said plurality of gears against movement relative to said frame for thereby determining mechanically driving ratios between the driving and driven members, and selectively operable retarding means connected with other parts of said gearings for controlling the ratio of relative movement of said other parts of said gearings and thereby effective for modifying the driving ratios established by said individual brake means.

OTTO E. SZEKELY.